United States Patent [19]

von Rybinski et al.

[11] Patent Number: 5,028,238

[45] Date of Patent: Jul. 2, 1991

[54] DISPERSANTS AND THEIR USE IN AQUEOUS COAL SUSPENSIONS

[76] Inventors: Wolfgang von Rybinski, Johannes-Hesse-Strasse 31, 4000 Duesseldorf; Thomas Foerster, Adalbert-Stifter-Strasse 15, 4006 Erkrath, both of Fed. Rep. of Germany

[21] Appl. No.: 167,052

[22] Filed: Mar. 11, 1988

[30] Foreign Application Priority Data

Mar. 12, 1987 [DE] Fed. Rep. of Germany ....... 3707941

[51] Int. Cl.$^5$ .................................................. C10L 1/32
[52] U.S. Cl. ........................................ 44/280; 44/620; 252/312; 252/351
[58] Field of Search .................. 44/51, 77; 252/351, 252/312

[56] References Cited

U.S. PATENT DOCUMENTS

| | | | |
|---|---|---|---|
| 4,088,453 | 5/1978 | Wiese et al. | 44/51 |
| 4,187,078 | 2/1980 | Shimizu et al. | 44/51 |
| 4,217,109 | 8/1980 | Siwersson et al. | 44/51 |
| 4,302,212 | 11/1981 | Yamamura et al. | 44/51 |
| 4,358,293 | 11/1982 | Mark | 44/51 |
| 4,392,865 | 7/1983 | Grosse et al. | 44/51 |
| 4,432,771 | 2/1984 | Sawyer, Jr. | 44/51 |
| 4,465,495 | 8/1984 | Scheffee | 44/51 |
| 4,472,170 | 9/1984 | Hellyer | 44/51 |
| 4,496,367 | 1/1985 | Mathiesen et al. | 44/51 |
| 4,504,277 | 3/1985 | Scheffee | 44/51 |
| 4,515,602 | 5/1985 | Keller, Jr. et al. | 44/51 |
| 4,547,199 | 10/1985 | Boehmke et al. | 44/51 |
| 4,675,025 | 6/1987 | Oppenlaender et al. | 44/51 |

FOREIGN PATENT DOCUMENTS

| | | |
|---|---|---|
| 50412 | 9/1981 | European Pat. Off. . |
| 92353 | 4/1983 | European Pat. Off. . |
| 0077909 | 5/1983 | European Pat. Off. . |
| 0089766 | 9/1983 | European Pat. Off. . |
| 0108302 | 5/1984 | European Pat. Off. . |
| 2727943 | 3/1984 | Fed. Rep. of Germany . |

*Primary Examiner*—William R. Dixon, Jr.
*Assistant Examiner*—Margaret B. Medley

[57] ABSTRACT

Dispersants for aqueous coal suspensions containing
(a) lignin sulfonic acid and/or alkali metal, alkaline earth metal and/or ammonium salts thereof,
(b) one or more alkyl ether phosphates corresponding to general formulae (I) and/or (II) below

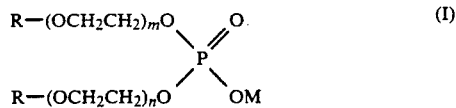

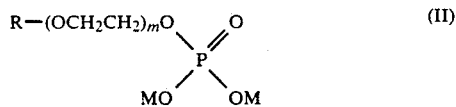

in which
R is straight-chain or branched $C_8$–$C_{22}$ alkyl or alkenyl radical,
M is hydrogen, an alkali metal, ammonium, or an alkaline earth metal, and
m and n are numbers of from 1 to 15, and
(c) optionally, other auxiliaries of the type typically present in such dispersants.

15 Claims, No Drawings

DISPERSANTS AND THEIR USE IN AQUEOUS COAL SUSPENSIONS

BACKGROUND OF THE INVENTION

1. Field of the Invention

This invention relates to dispersants containing lignin sulfonic acid and/or alkali metal, alkaline earth metal, or ammonium salts thereof and to their use in aqueous coal suspensions.

2. Statement of Related Art

In view of the expected shortage of crude oil as a fuel due to the decline in natural reserves worth producing on the one hand and the need to use them as a chemical raw material on the other hand, energy-recovery processes in which aqueous coal suspensions are subjected to high-temperature combustion have recently been gaining in importance. Aqueous coal suspensions offer the major advantage over coal in solid, albeit finely divided, form in that they may be conveyed over relatively long distances at relatively low cost in transport systems known from the transport of crude oil, for example pipelines or overland pipelines. However, the disadvantage is that the dispersion medium, water, which is inert to combustion, reduces the gross calorific value of aqueous coal suspensions. So far as the coal content of aqueous coal suspensions is concerned, an excessive coal content has to be avoided with transportability in mind whereas as high a coal content as possible is desired with the gross calorific value in mind.

It is known from the prior art that aqueous coal suspensions may be provided with additives which improve fluidity during transport in pipelines, but which on the other hand allow an increase in the coal content of the aqueous coal suspensions and hence considerably increase the gross calorific value. Such additives also improve the combustion properties of the aqueous coal suspensions. For example, it is known from German Patent 27 27 943, from EP-B 0 050 412, from EP-A 0 089 766 and from EP-A 0 092 353 that organic dispersants selected from the group comprising organic sulfonic acids and/or alkali metal, alkaline-earth metal or ammonium salts thereof, more especially lignin sulfonic acid and corresponding salts thereof, may be incorporated in aqueous coal suspensions to improve their fluidity and, at the same time, to increase their coal content. Providing the coal used to prepare the coal suspensions has a suitable sieve analysis, it is possible to produce readily pumpable suspensions having coal contents of from 10 to 50% by weight.

However, it is generally desired to further increase the coal content in order to increase the gross calorific value of aqueous coal suspensions, because aqueous coal suspensions can ony be economically used for industrial combustion processes for energy recovery beyond a coal content of 65% by weight coal, based on the total weight of the suspension. In addition, it is desired to further reduce the viscosity of aqueous coal suspensions to provide for convenient transport even through pipelines of comparatively narrow cross-section.

DESCRIPTION OF THE INVENTION

Other than in the operating examples, or where otherwise indicated, all numbers expressing quantities of ingredients or reaction conditions used herein are to be understood as modified in all instances by the term "about".

It has now surprisingly been found that the viscosity of aqueous coal suspensions can be further reduced and their solids content further increased if, in addition to alkali metal and/or alkaline earth metal lignin sulfonates as additives, alkyl ether phosphates are added as co-additives to aqueous coal suspensions.

The dispersants of the present invention contain lignin sulfonic acid and/or alkali metal, alkaline earth metal, and/or ammonium salts thereof, and at least one alkyl ether phosphate corresponding to general formulae (I) and/or (II) below:

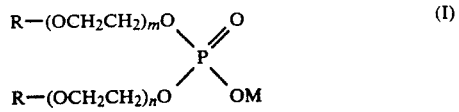

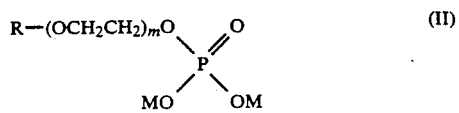

in which
R is a straight-chain or branched $C_8$–$C_{22}$ alkyl or alkenyl radical, M is hydrogen, an alkali metal, ammonium, or alkaline-earth metal and wherein the M groups in formula II can be the same or different, and m and n are independently numbers of from 1 to 15, and optionally other auxiliaries of the type typically present in dispersants of the present type.

The present invention also relates to the use of these dispersants in aqueous coal suspensions.

The dispersant according to the invention contains one or more compounds from the group of lignin sulfonic acid, alkali metal salts of lignin sulfonic acid, alkaline earth metal salts of lignin sulfonic acid, and ammonium salts of lignin sulfonic acid as an anionic, surfactant-like component. These compounds can be present in the dispersants either individually or in the form of mixtures of two or more compounds. With respect to mixtures, the quantitative ratio between the individual compounds to one another is not critical. The primary object of these compounds is to reduce the interfacial tension between the coal particles and the aqueous phase in order to wet the surface of the coal particles.

The dispersants according to the invention contain as another essential component at least one alkyl ether phosphate corresponding to general formulae (I) and (II) set forth above.

In general formulae (I) and (II), R can be n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-uneicosyl and n-docosyl for the linear alkyl radicals. R can also represent the branched-chain homologs of the above n-alkyl radicals, or can be mono- or polyunsaturated radicals which correspond to the straight-chain or branched alkyl radicals in the number of carbon atoms and which contain one or more C=C bond(s) anywhere in the chain. However, since the starting compounds corresponding to the substituent R in general formulae (I) and (II) preferably emanate from the fatty acid component of fats and oils of animal or vegetable origin, in which the lengths of the alkyl or alkenyl chains are scattered over a more or less wide chain-length range, the substituents R in general formulae (I) and (II) are normally mixtures of alkyl and alkenyl radicals of different structure and chain length. In this connection, it is possible to use compounds which, depending on their origin, contain from certain native fats and oils alkyl radicals R which correspond to the entire spectrum of fatty alkyl radicals of such fats and oils. However, it is also possible to select suitable fractions within a limited chain-length range. Compounds corresponding to general formulae (I) and (II) also include individal, synthetically obtained and hence pure compounds (I) and/or (II). For example, it is possible to use alkyl ether phosphates (I) and/or (II) of which the alkyl radical R emanates from fatty alcohols or fatty alcohol mixtures of the type formed in the known Ziegler and oxo reactions.

In preferred embodiments, the dispersants according to the invention contain one or more alkyl ether phosphates corresponding to general formulae (I) and/or (II) above, in which R is a straight-chain alkyl or alkenyl radical. This is particularly the case when the fatty alcohols (ROH) on which the synthesis of the compounds corresponding to general formulae (I) and (II) is based are of the type obtained from native fats and oils, for example via the transesterification of the triglycerides with methanol, followed by catalytic hydrogenation of the fatty acid methyl ester. In the natural mixtures, the straight-chain radicals R predominate.

In another embodiment, alkyl ether phosphates in which R is a straight-chain $C_{12}-C_{18}$ alkyl or alkenyl radical are preferably used in the dispersants of the invention. Apart from their convenient availability, the $C_{12}-C_{18}$ alkyl or alkenyl radicals occurring particularly frequently in the natural chain length spectrum have the further major advantage that they can be used as components in dispersants which are particularly effective in reducing the viscosity of aqueous coal suspensions.

The alkyl ether phosphates corresponding to general formulae (I) and (II) present in the dispersants according to the invention can be used either as free acids of the monoesters (II) or diesters (I), in which case M in the general formulae is hydrogen. However, the corresponding water-soluble alkali metal, alkaline-earth metal and/or ammonium salts of the particular free acids can also be used. In this case, M in the above general formulae is an alkali metal, an alkaline earth metal, or ammonium. Preferred alkali metals are lithium, sodium and potassium; preferred alkaline-earth metals are magnesium, calcium and strontium. M is preferably an alkali metal, particularly sodium.

In general formulae (I) and (II), the indices m and n are numbers of from 1 to 15. The number of ethoxy groups corresponding to the indices results from reactions of the fatty alcohols with ethylene oxide, m and n indicating the ratio of ethylene oxide to alcohol on which the reaction is based. It is known that not only pure substances, but also mixtures of substances differing from one another in the number of ethoxy groups added are formed in the course of such reactions. Accordingly m and n represent only average values and, in practice, may be whole or broken numbers within the above range. In particularly preferred embodiments, the dispersants according to the invention contain one or more compounds corresponding to general formulae (I) and (II), in which m and n are numbers in the range of from 2 to 12 and, more preferably, in the range of from 8 to 10.

In other particularly preferred embodiments, the dispersants according to the invention contain one or more alkyl ether phosphates corresponding to gerneral formulae (I) and/or (II), in which R represents straight-chain $C_{12}-C_{18}$ alkyl or alkenyl radicals, M is sodium and m and n are numbers of from 8 to 10.

Phosphoric acid mono- or diester salts such as these together with the lignin sulfonic acid and/or water-soluble salts thereof, provide for a particularly distinct reduction in the viscosity of aqueous coal suspensions, despite a high coal content. In addition, aqueous suspensions such as these have an advantgeously high gross calorific value.

In preferred embodiments of the invention, the aqueous dispersants contain lignin sulfonic acid and/or salts thereof and one or more alkyl ether phosphates corresponding to general formulae (I) and (II) in a ratio by weight in the range of from 4:1 to 20:1. By virtue of the particularly good results they provide in reducing the viscosity of aqueous coal suspensions, it is of advantage to use dispersants in which lignin sulfonic acid and/or salts thereof and one or more alkyl ether phosphates are present in a ratio by weight of from 4:1 to 10:1.

In addition to the components mentioned above, the dispersants of the invention may also contain other components which are not absolutely essential to the dispersing effect of the dispersants. Such components may include, for example, stabilizers, foam inhibitors, biocides and/or corrosion inhibitors which are known as such for this purpose and which are also used in dispersants known from the prior art. For example, guar or guar derivatives, cellulose or cellulose derivatives, xanthan or the like are added as stabilizers. The foam inhibitors include adducts of propylene oxide and/or ethylene oxide with fatty alcohols and/or long-chain fatty acids, for example with behenic acid. Biocides or corrosion inhibitors which may be used with advantage are also known from the prior art.

The dispersants of the invention are prepared by methods known per se from the prior art, for example in ball mills or conventional stirring vessels. Pastes or highly viscous liquids are normally formed, being formulated either as such or in admixture with water, preferably in a ratio by weight of 1:1.

To prepare aqueous coal suspensions, the dispersants formulated in paste or highly viscous liquid form are stirred into the aqueous phase in which they are then normally present in quantities of from 0.01 to 5% by weight, based on the quantity of coal.

Over the entire concentration range indicated, they provide for a distinct reduction in the viscosity of aqueous coal suspensions compared with suspensions of the type in which—as known from the prior art—sodium lignin sulfonate is used on its own as additive, i.e., without any other additives. Suspensions of the invention have viscosity values which enable them to be pumped without difficulty through pipes and pipelines and delivered to the combustion furnaces. By virtue of their high coal content of 65% and higher, they have a very high gross calorific value, making aqueous coal suspensions of the present type inexpensive and economical to use in power stations.

The invention is illustrated but not limited by the following Examples.

EXAMPLES

Examples 1 to 3

A German coal sample was ground to an average particle size of 100%<200 μm and separated from coarser coal particles by means of a sieve. Aqueous coal suspensions containing 65% coal were prepared using sodium lignin sulfonate (source: Lignin-Chemie, Waldhof-Holmen, Federal Republic of Germany) and a mixture of alkyl ether phosphates (mixture of the sodium salts of phosphoric acid mono- and diesters containing from 8 to 18 carbon atoms in the alkyl radical and on average 9.5 ethoxy groups (source: Forlanit (®)p, Henkel KGaA, Düsseldorf, Federal Republic of Germany).The concentration of the above dispersant of the invention was 1% by weight, based on the quantity of coal.

The apparent viscosity of the suspensions was measured as a function of the shear rate using a rotational viscosimeter (Contraves Rheomat 30) in the shear rate range of from $0\ s^{-1}$ to $200\ s^{-1}$.

The results are shown in the following Table.

| Example | Ratio of lignin sulfonate to alkyl ether phosphate | Viscosity (mPa.s) | | |
| --- | --- | --- | --- | --- |
| | | at $50\ s^{-1}$ | at $100\ s^{-1}$ | at $200\ s^{-1}$ |
| 1 | 19:1 | 492 | 456 | 422 |
| 2 | 9:1 | 485 | 447 | 413 |
| 3 | 4:1 | 446 | 410 | 382 |
| Comp. | 1:0 | 500 | 456 | 477 |

Result:

Over the entire shear rate range, the apparent viscosity of aqueous coal suspensions is distinctly lower than where pure lignin sulfonate is used (cf. following Comparison Example).

COMPARISON EXAMPLE

The procedure was the same as in Examples 1 to 3 using a dispersant containing only sodium lignin sulfonate as additive. The result is shown in the preceding Table (under "Comp.").

We claim:

1. A dispersant composition for aqueous coal suspensions comprising
   (a) at least one of lignin sulfonic acid, an alkali metal salt thereof, an alkaline earth metal salt thereof, or the ammonium salt thereof, and
   (b) at least one alkyl ether phosphate of the formula $$R-(OCH_2CH_2)_mO\diagdown_{P}\diagup^{O} \quad (I)$$
$$R-(OCH_2CH_2)_nO\diagup\phantom{P}\diagdown OM \quad ,\text{or}$$

$$R-(OCH_2CH_2)_mO\diagdown_{P}\diagup^{O} \quad (II)$$
$$MO\diagup\phantom{P}\diagdown OM$$

in which
R is a straight-chain or branched $C_8$–$C_{22}$ alkyl or alkenyl radical,
M is hydrogen, an alkali metal, ammonium, or an alkaline earth metal, and
m and n are numbers of from 1 to 15;
and wherein the ratio by weight of (a) to (b) is in the range of from about 4:1 to about 20:1.

2. The dispersant composition of claim 1 wherein in (b) R is a straight-chain $C_{12}$–$C_{18}$ alkyl or alkenyl radical.

3. The dispersant composition of claim 1 wherein in (b) M is an alkali metal.

4. A dispersant composition of claim 3 wherein M is sodium.

5. The dispersant composition of claim 1 wherein in (b) m and n are numbers of from 2 to 12.

6. The dispersant composition of claim 5 wherein m and n are numbers of 8 to 10.

7. The dispersant composition of claim 1 wherein in (b) R is a straight-chain $C_{12}$–$C_{18}$ alkyl or alkenyl radical, M is sodium, and m and n are numbers of from 8 to 10.

8. The dispersant composition of claim 1 wherein the ratio of (a) to (b) is from about 4:1 to about 10:1.

9. The dispersant composition of claim 1 wherein the composition also contains one or more of a stabilizer, a form inhibitor, a biocide, or a corrosion inhibitor.

10. An aqueous coal suspension containing from about 0.01 to about 5% by weight, based on the quantity of coal, of a dispersant composition comprising
    (a) at least one of lignin sulfonic acid, and alkali metal salt thereof, an alkaline earth metal salt thereof, or the ammonium salt thereof, and
    (b) at least one alkyl ether phosphate of the formula $$R-(OCH_2CH_2)_mO\diagdown_{P}\diagup^{O} \quad (I)$$
$$R-(OCH_2CH_2)_nO\diagup\phantom{P}\diagdown OM \quad ,\text{or}$$

$$R-(OCH_2CH_2)_mO\diagdown_{P}\diagup^{O} \quad (II)$$
$$MO\diagup\phantom{P}\diagdown OM$$

in which
R is a straight-chain or branched $C_8$–$C_{22}$ alkyl or alkenyl radical,
M is hydrogen, an alkali metal, ammonium, or an alkaline earth metal, and
m and n are numbers of from 1 to 15;
and wherein the ratio by weight of (a) to (b) is in the range of from about 4:1 to about 20.1.

11. The aqueous coal composition of claim 10 wherein in (b) R is a straight-chain $C_{12}$–$C_{18}$ alkyl or alkenyl radical, M is sodium, and m and n are numbers of from 8 to 10.

12. The aqueous coal composition of claim 10 wherein the composition also contains one or more of a stabilizer, a foam inhibitor, a biocide, or a corrosion inhibitor.

13. A method of reducing the viscosity of an aqueous coal suspension comprising adding thereto from about 0.01 to about 5% by weight, based on the quantity of coal, of a dispersant composition comprising
    (a) at least one of lignin sulfonic acid, an alkali metal salt thereof, an alkaline earth metal salt thereof, or the ammonium salt thereof, and
    (b) at least one alkyl ether phosphate of the formula $$R-(OCH_2CH_2)_mO\diagdown_{P}\diagup^{O} \quad (I)$$
$$R-(OCH_2CH_2)_nO\diagup\phantom{P}\diagdown OM \quad ,\text{or}$$

-continued

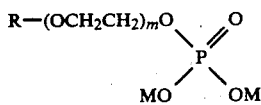 (II)

in which

R is a straight-chain or branched $C_8$–$C_{22}$ alkyl or alkenyl radical,

M is hydrogen, an alkali metal, ammonium, or an alkaline earth metal, and m and n are numbers or from 1 to 15;

and wherein the ratio by weight of (a) to (b) is in the range of from about 4:1 to about 20:1.

14. The method of claim 13 wherein in component (b) of the dispersant composition R is a straight-chain $C_{12}$–$C_{18}$ alkyl or alkenyl radical, M is sodium, and m and n are numbers of from 8 to 10.

15. The method of claim 13 wherein the dispersant composition also contains one or more of a stabilizer, a form inhibitor, a biocide, or a corrosion inhibitor.

* * * * *